July 18, 1933. J. A. MILLER 1,919,116
SOUND RECORD AND METHOD OF AND APPARATUS FOR MAKING IT
Filed Sept. 30, 1931 4 Sheets-Sheet 1

INVENTOR
James A. Miller
BY
ATTORNEY

July 18, 1933.  J. A. MILLER  1,919,116
SOUND RECORD AND METHOD OF AND APPARATUS FOR MAKING IT
Filed Sept. 30, 1931   4 Sheets-Sheet 2

INVENTOR
James A. Miller
BY
ATTORNEYS

July 18, 1933.   J. A. MILLER   1,919,116
SOUND RECORD AND METHOD OF AND APPARATUS FOR MAKING IT
Filed Sept. 30, 1931    4 Sheets-Sheet 3

INVENTOR
James A. Miller
BY
ATTORNEY

July 18, 1933. J. A. MILLER 1,919,116
SOUND RECORD AND METHOD OF AND APPARATUS FOR MAKING IT
Filed Sept. 30, 1931 4 Sheets-Sheet 4

INVENTOR
James A. Miller
BY
ATTORNEYS

Patented July 18, 1933

1,919,116

UNITED STATES PATENT OFFICE

JAMES A. MILLER, OF FOREST HILLS, NEW YORK

SOUND RECORD AND METHOD OF AND APPARATUS FOR MAKING IT

Application filed September 30, 1931. Serial No. 566,152.

This invention relates to sound recording and reproduction. More particularly it relates to the art of reproducing sound optically and to the preparation of the sound record for that particular method of reproduction. The term "optically" as here used, means by the use of light which produces trans-illumination through the sound track or reflection from it. A familiar example of a system in which the sound is reproduced optically is the "sound-on-film" system now in extensive use in which a sound track on the edge of a moving picture film intercepts a beam of light and controls the amount of light which passes through the sound track and falls upon a light sensitive cell, which in turn controls the amount of current to a sound reproducing device such as a loudspeaker.

Non-optical systems include all systems where the reproduction of the sound is accomplished in some way other than by the use of light. Chief among these is the phonograph system in which sound is reproduced from a disc or cylinder record by means of a stylus engaging in the sound groove in the record, the stylus being connected either mechanically or electrically to a reproducing diaphragm. Non-optical systems might be more specifically termed "mechanical systems" for the purpose of this description.

It is evident that the sound track in an optical system of sound reproduction must have quite different characteristics from the sound track of a mechanical system. In an optical system the sound track must control the amount of light passing through it or reflected from it by confronting a beam of light either with varying degrees of transparency or varying areas of transparency. The total absence of these considerations in the mechanical systems have caused all of the sound tracks so far developed for mechanical systems to be wholly unsuited for use in optical systems.

In the "sound-on-film" system referred to above, the system is optical not only so far as reproduction is concerned, but also as to recording because the sound is initially recorded on a light sensitive film by a photographic process. The photographic process usually takes either of two forms. In one method known as the "variable area method", light is passed onto the sensitized film through a slit or opening, the size of which is controlled by the sound waves. This produces on the developed film a sound track which is uniformly opaque but of varying width or area. In the other method known as the "variable density method", a slit through which the light is caused to pass before it impinges on the film is of constant size, but the intensity of the light source itself is varied in accordance with the sound waves. This produces on the developed film a sound track of constant width but of varying degree of transparency.

The optical system of reproducing sound would be more satisfactory if the sound track on the record or film were an accurate representation of the original sound waves, but it is impossible to obtain a scientifically correct sound track on a record if the sound is initially recorded by the optical or photographic method. This is due in part to the lack of definition, i. e., the blurring or fuzziness caused by halation effects which are present even in the best lens systems and also by the finite width possessed by the slit which forms a part of all optical recording systems. Another and very important disadvantage of initially recording the sound waves optically or photographically is that the sound record thus prepared cannot be played back immediately after it is made. The entire record must first be photographically developed before any part of it can be played back. These and other disadvantages are overcome in my system in which the initial sound track, i. e., the first sound track formed by the initial recording of the sound waves, though intended and adapted for use in an optical system, is produced mechanically and not optically or photographically, this in spite of the fact that it has heretofore been thought impossible to mechanically produce a sound track capable of optical reproduction.

According to the preferred form of my invention, the sound is recorded by cutting an opaque coating from a transparent base in such a way that the transparent sound track thus formed has a width which varies in accordance with the sound waves. The medium on which the sound track is made may be a strip of photographic film like that which is now used in making talking moving pictures but which has been exposed and developed so that there is a base of transparent celluloid having an opaque coating, or the film strip may be a specially prepared one as hereinafter described. The reasons why my invention makes it possible for the first time to cut a sound track on a film strip, capable of optical reproduction, will appear later on. Briefly, the apparatus comprises in its preferred form a knife which is vibrated by electrical means in a direction normal to the surface of the record and in accordance with the sound waves. The cutting edge of the knife is wedge-shaped with the apex of the wege toward the film. Slight variations in the movement of the knife toward and away from the record will reproduce large variations in the width of the transparent sound track formed as the knife cuts the opaque coating from the transparent base. While the movement of the knife in a direction normal to the record produces a groove of the hill-and-dale type, this characteristic of the sound track is not made use of in the reproduction of the sound. It is only the accompanying varying width of the sound track which is made use of for this purpose. Alternative ways of producing the sound track will be later described.

The principal objects of the invention are as follows:

To provide an improved sound record of the optical reproduction type and an improved method of and apparatus for making it.

To overcome the disadvantages of the present sound tracks of the optical reproduction type.

To make a sound record of the optical reproduction type that can be played back immediately after the sound waves are initially recorded.

To record sound for reproduction in an optical system by purely mechanical and non-optical means.

The invention is illustrated in the accompanying drawings, in which—

Fig. 13 is a side elevation of the recording stylus shown in Fig. 12 showing the manner in which it may be rotated.

Fig. 14 is a sectional view through an electromagnetic unit adapted to vibrate the film strip toward and away from that type of recording stylus shown in Figs. 12 and 13.

At the present time I regard talking moving pictures as one of the important fields of use of my invention and for this reason the drawings illustrate the invention as applied to the recording of sound on a film strip. However, it should be made clear at the outset that the invention is not limited to the recording of sound on a film strip but it may be used to record sound on other mediums and the sound records produced by my method may be used in optical reproduction systems other than talking moving pictures.

Figure 1:
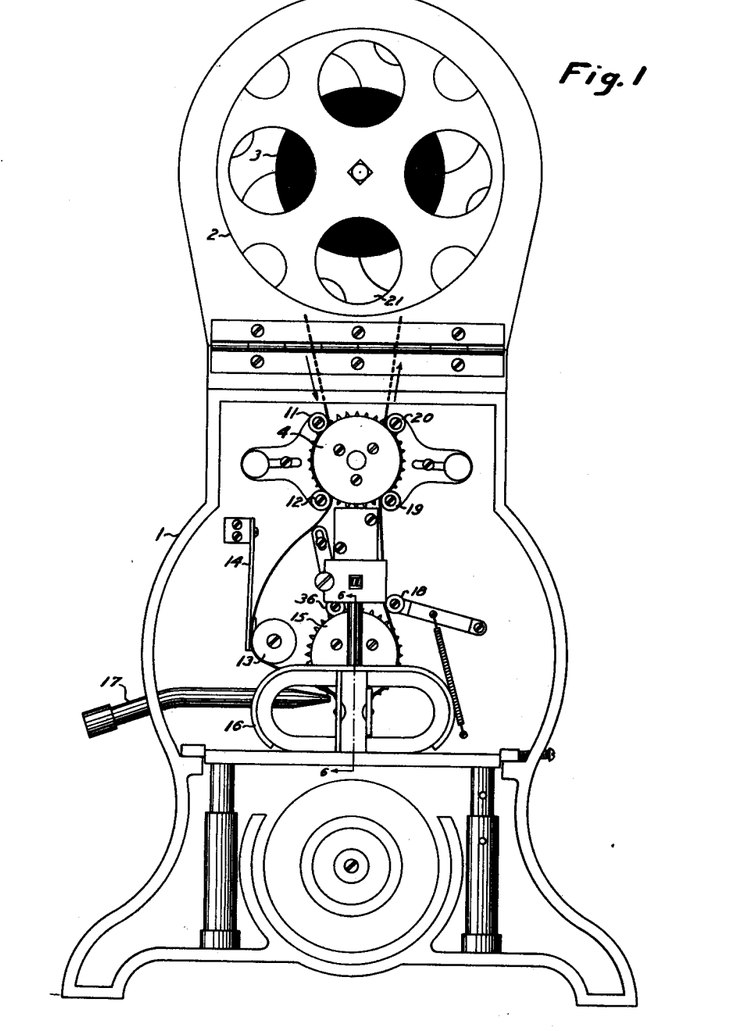
Figure 1 is a side elevation of one form of apparatus embodying certain mechanical features of the invention and in which an improved sound record may be made by the use of my method.
Figures 2, 3, 4, 5, 6:
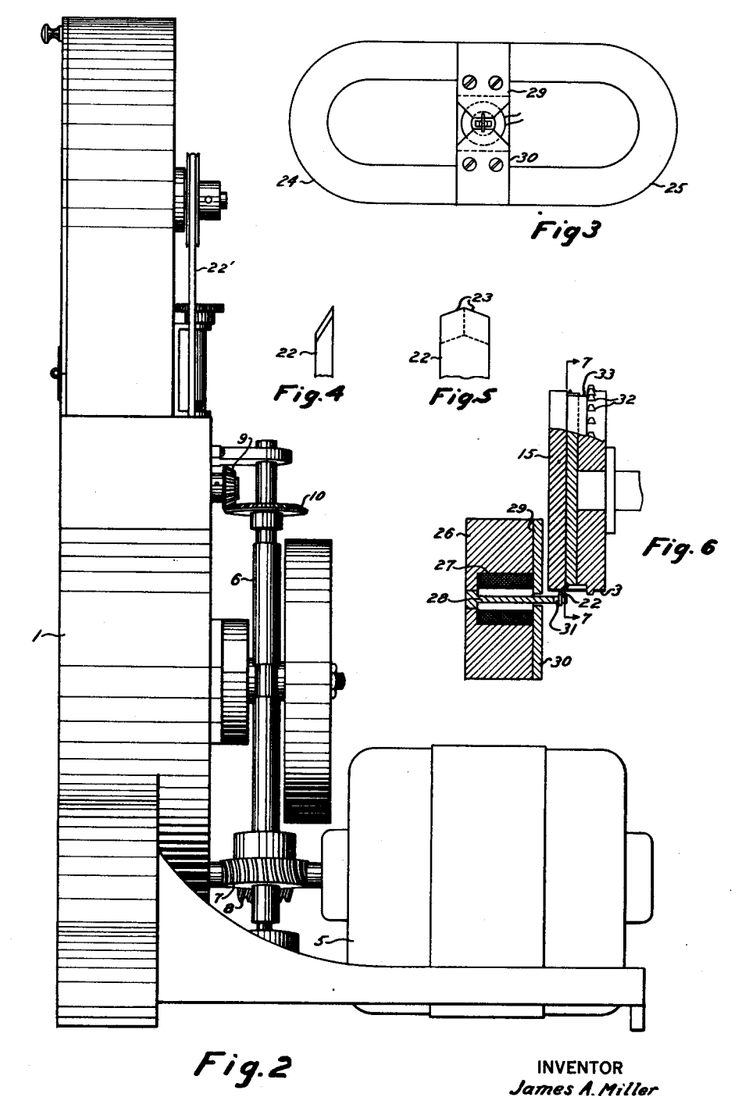
Fig. 2 is a side elevation of the apparatus shown in Fig. 1.
Fig. 3 is a side elevation of the electromagnetic unit for actuating the recording stylus.
Fig. 4 is a side elevation of one form of recording stylus.
Fig. 5 is a front elevation of the recording stylus shown in Fig. 4.
Fig. 6 is a vertical section taken on the line 6—6 of Fig. 1.

Referring first to Figs. 1 and 2, the apparatus therein illustrated comprises a suitable housing or casing 1 in the upper part of which is mounted a reel 2 adapted to contain a quantity of film strip 3 on which the sound is to be recorded. The film strip is pulled from the reel 2 by a sprocket wheel 4 around one side of which the film strip passes so that the strip is fed downwardly as indicated by the arrows. The sprocket wheel 4 is positively rotated by an electric motor 5 (Fig. 2). The motor 5 is geared to a vertical shaft 6 by gearing 7—8 and the vertical shaft 6 is in turn geared to the shaft of sprocket wheel 4 by means of gearing 9—10. As the film strip moves downwardly around the left side of sprocket wheel 4 (as viewed in Fig. 1) it is pressed in contact with the sprocket wheel by means of guide rollers 11 and 12. The film strip then passes over an idler roller 13 mounted on a spring arm 14 and from this roller it passes around and beneath a drum 15. The sound is recorded on the film strip 3 when it reaches the lowermost point of the drum 15. The details of the drum 15 and the manner in which it holds the film strip while the sound is being recorded will be described later. In Figs. 1 and 2 the recording stylus does not show nor do the details of the electro-magnetic unit which is used to vibrate the stylus. However, the rear side of the electromagnetic unit can be seen at 16 in Fig. 1. A suction nozzle 17 whose intake end is located near the recording stylus may be connected to any suitable suction producing means to conduct away the shavings taken from the film by the recording stylus. After the film strip leaves the drum 15 it passes upwardly by an idler roller 18 and then around the right hand side of the sprocket wheel 4 in engagement with which it is held by the guide rollers 19 and 20. The film strip is thus pulled around the drum 15 by the sprocket wheel 4 and is fed upwardly toward a receiving reel 21 mounted in the upper part of the housing 1. This reel is positively driven by means of a belt 22' (Fig. 2) which in turn is driven from the shaft on which the sprocket wheel 4 is mounted.

The preferred form of stylus for recording the sound on the film strip is shown at 22 in Figs. 4 and 5. It has a wedge-shaped cutting edge 23 by which the film passes in the direction shown by the arrow in Fig. 4. The electromagnetic unit for vibrating the stylus is shown in rear view at 16 in Fig. 1, in front view in Fig. 3 and in sectional view in Fig. 6. It need not take the particular form shown in the drawings but as illustrated it comprises two horseshoe magnets 24 and 25 positioned in the same plane, with their polar extremities in contact with an intermediate insert 26 of magnetic material. The insert 26 houses a so-called speech coil 27 through the center of which passes an armature 28. The armature 28 is of the reed type being rigidly mounted at its rear end in the magnetic material 26. The forward end of the armature 28 extends through an air gap formed by pole pieces 29 and 30. The stylus 22 is mounted in the end of armature 28 in any suitable way. For instance, the extremity of the armature 28 may have a vertical slot 31 in which the stylus may be held by means of wax. The stylus is positioned with its point uppermost. The sound to be recorded is picked up in the customary way and converted into electrical currents which are amplified and then passed through the speech coil 27. The fluctuating current through the coil 27 causes the armature 28 to vibrate in accordance with the sound to be recorded and causes the stylus to cut from the film a narrow strip of its opaque coating leaving a transparent sound track which is capable of reproducing the sound in an optical reproducing system as will hereinafter be seen.

Figures 7, 8:
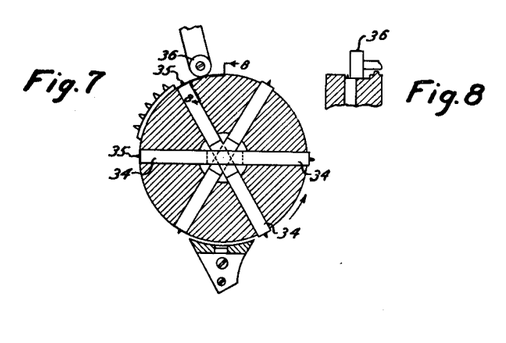
Fig. 7 is a vertical section taken on line 7—7 of Fig. 6.
Fig. 8 is a fragmentary sectional view taken on the line 8—8 of Fig. 7.

The details of the drum 15 over which the film strip passes as the sound is being recorded are shown in Figs. 6 and 7. One row of sprocket teeth 32 is provided on the drum for engaging the usual perforations at one edge of the film strip. In this connection it should be noted that the type of film strip on which I prefer to record the sound is similar to a strip of moving picture film cut in half longitudinally so that there is a series of perforations along one edge only of the film strip. The periphery of the drum 15 is provided with an annular recess 33 such that the intermediate portion of the film strip 3 bridges the recess as shown in Fig. 6. A plurality of rods 34 (Fig. 7) pass diametrically through the drum, each rod being capable of a slight sliding movement through the drum and longitudinally of itself. Each bar carries at each end a pin 35. The bars 34 are so located with respect to the recess 33 and they are of such a length that when one end of a bar is flush with the bottom of recess 33 the other end projects far enough into the recess to cause the pin carried by that end to penetrate that portion of the film strip which is bridging the recess. A roller 36 positioned above the drum 35 pushes each bar down as it passes beneath it as shown in Fig. 8. This causes the pin at the opposite end of the bar to penetrate the film strip. The position of the roller 36 is such that the penetrating action of the film strip by the pin takes place just beyond i. e., after the recording point. This establishes a more direct connection between the drum and the film strip and thus a more positive feed of the film strip than if the sprocket holes in the film strip and the sprocket teeth on the drum were depended upon solely for this purpose.

Figure 9:
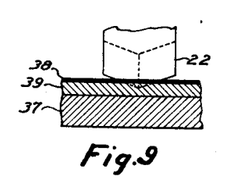
Fig. 9 is an enlarged transverse section of a portion of the film strip, the recording stylus appearing in front elevation.

The way in which the mechanical action of the recording stylus on the film strip produces a sound track capable of use in an optical reproduction system will now be described. The film strip on which I record the sound is not an unexposed negative such as now used in optical recording systems. In its preferred form it comprises a celluloid base 37, an opaque coating 38 and an intermediate layer 39 of some material softer than the celluloid base, such as gelatin. The gelatin layer 39 should be approximately .002 inches thick. The film may be the usual moving picture film negative which has been exposed and developed so as to render the emulsion opaque or the film may be a specially prepared one having an opaque coating formed in some other way. The parts of the apparatus are so related that when the film strip is running through the apparatus and no sound is being recorded the stylus cuts through the opaque coating 38 and part way into the gelatin layer 39 as shown in Fig. 9. (In this and subsequent figures of a similar nature the position of the film and stylus has been inverted for the sake of clearness). This will produce in the opaque coating a transparent track of uniform width. In Fig. 9, the film strip is represented in transverse section so that it is moving in a direction at right angles to the plane of the paper and away from the observer. When sound is being recorded, the vibration of the stylus 22 varies the width of the transparent track formed in the opaque coating as shown at 40 in Fig. 10. Of course the nature of the sound track will depend upon the character of the sound being recorded, the sound track shown in Fig. 10 being of that type which would be reproduced by a single frequency note, say 60 cycles.

Figure 10:
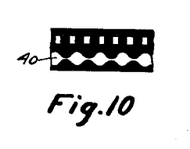
Fig. 10 is a plan view of a portion of a film strip on which sound has been recorded by a recording stylus of the kind shown in Fig. 9.
Figure 11:
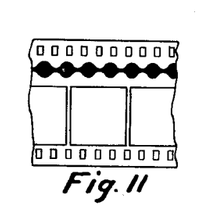
Fig. 11 is a plan view of a small portion of moving picture film on which there has been printed a sound track by using the sound record of Fig. 10 as a negative.

It will now be seen that the stylus really cuts a groove in the film strip and that the groove has a varying depth as well as a varying width. However, the varying depth of the sound track is not made use of. It is only the varying width of the sound track that is made use of in the reproduction system. Immediately after the sound is recorded in this fashion the record can be played back because when it is used in an optical reproduction system it is capable of controlling and varying the amount of light passing through the sound track and falling upon the usual photoelectric cell. While a film strip of the kind shown in Fig. 10 is a sound record in itself and can be used as it stands in a sound reproducing system, it would be used as a negative in the process of making a talking moving picture. By the usual steps a sound track could be printed on a moving picture film as shown in Fig. 11.

Figure 12:
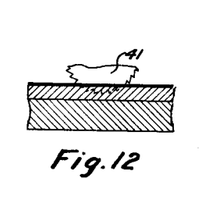
Fig. 12 is a view similar to Fig. 9 but shows a modified form of recording stylus.

In Fig. 12 the recording stylus is in the nature of a rotary cutting tool 41 similar to a circular saw. The stylus may be rotated in any suitable way as by means of an electric motor 42 (Fig. 13). In this arrangement it is more convenient to vibrate the film strip than the rotary cutting tool. To effect this the edge of the film strip may be engaged by the end of the armature 28 of the electromagnetic unit as shown at 43 in Fig. 14. For instance the film strip may be guided by rollers 44 (Fig. 13) through a slot in the end of the armature 28 so that as the armature vibrates it causes the film strip to move in a direction toward and away from the edge of the cutting stylus 41. This will produce a sound track of the kind illustrated in Fig. 10.

Figure 15:
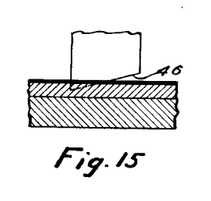
Fig. 15 is a view similar to Figs. 9 and 12 showing a further modified form of recording stylus.
Figure 16:
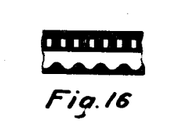
Fig. 16 is a plan view of a portion of a film strip on which sound has been recorded by the use of a recording stylus of the kind shown in Fig. 15.
Figure 17:
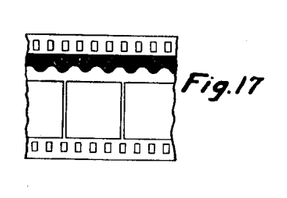
Fig. 17 is a plan view of a portion of a moving picture film on which a sound track has been printed by using the film strip of Fig. 16 as a negative.

Instead of using a wedge-shaped cutting stylus of the kind shown in Figs. 4 and 5, a stylus of the kind shown in Fig. 15 may be used having one straight cutting edge 46 which makes an angle with the surface of the film strip. This will produce a sound track of the kind shown in Fig. 16 which is bounded on one side by a straight line and on the other side by a line which undulates in accordance with the recorded sound. A portion of a complete moving picture film containing a sound track made by using the record shown in Fig. 16 as a negative, is shown in Fig. 17.

The sound tracks so far described are of the variable area type. If it is desired to produce a sound track of the variable density type a film strip and cutting stylus of the kind shown in Fig. 18 may be used. Here the film strip may comprise a celluloid base 47 and a coating of translucent material 48 of such a depth that the stylus never cuts completely through it. The stylus 49 in this case may have a cutting edge 50 which is parallel with the surface of the film strip. When the stylus is vibrated in a direction normal to the surface of the film strip it will produce a sound track of varying depth as shown in Fig. 19.

Figure 19:
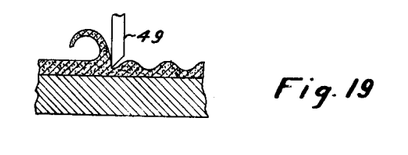
Fig. 19 is a longitudinal section through a portion of the film strip illustrating the manner in which the recording stylus of Fig. 18 cuts into the film coating.
Figure 20:
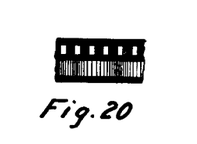
Fig. 20 is a plan view of a portion of film strip on which sound has been recorded by the use of the stylus shown in Figs. 18 and 19.
Figure 21:
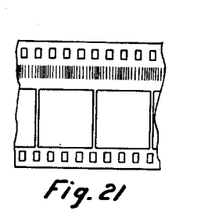
Fig. 21 is a plan view of a portion of a moving picture film on which there has been printed a sound track by using the film strip of Fig. 20 as a negative.

Fig. 20 shows a portion of a film strip containing a sound track made in this fashion and Fig. 21 shows a portion of a complete moving picture film on which there has been printed a sound track using the record of Fig. 20 as a negative. It is evident that those portions of the sound track in Fig. 19 where the most material has been removed will have greater transparency than those portions where less material has been removed. The initial record produced in this way may, therefore, be used to reproduce sound immediately after it is made because it is capable of varying the amount of light passing through the sound track onto a photoelectric cell. Also because the trans-illumination capacity of the sound track varies it may be used as a negative to print positives like that shown in Fig. 21.

Figure 18:
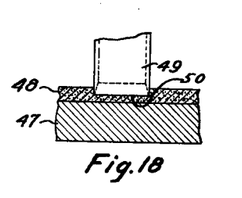
Fig. 18 is a view corresponding with Figs. 9, 12 and 15, showing a recording stylus adapted to produce a sound track of the variable density type.
Figure 22:
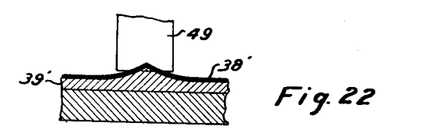
Figs. 22 and 23 are views corresponding with Fig. 9 illustrating alternative ways of producing a sound track of the kind shown in Fig. 10.
Figure 23:
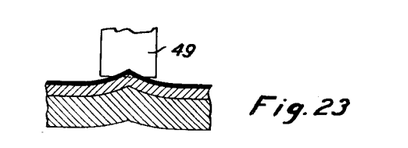
Figure 24:
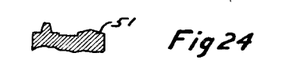
Fig. 24 is a fragmentary sectional view of a type of drum that is adapted to be used in the method illustrated in Fig. 23 for conducting the film past the recording point.

Figs. 22 and 23 illustrate different ways in which a sound track of the kind shown in Fig. 10 can be made by using a cutting stylus 49 of the kind shown in Fig. 18 instead of a wedge-shaped stylus. In Fig. 22 the gelatin layer 39' on the film strip and also the opaque coating 38' are so shaped as to form a longitudinal rib along the surface of the film strip, the side walls of the rib being slightly concave. It is evident that vibration of the stylus 49 in a direction toward and away from the film strip will produce a transparent sound track in the opaque coating 38' which has a varying width. The same type of sound track can be produced by the arrangement shown in Fig. 23 in which the film strip, instead of being preformed to a certain shape, as in Fig. 22, is deformed to that shape as it passes around the drum at the recording point. The film strip is the same as that shown in Fig. 9 but the roller 51 around which the film passes at the recording point has a peripheral ridge as shown in Fig. 24 which causes the film to assume the shape shown in Fig. 23 during the recording operation.

It has been said above that the film strip on which the sound is recorded to produce a sound track of the variable area type may be a strip of moving picture negative film which has been exposed and developed so that it has an opaque coating, or the film strip may be a specially prepared one. If it is a specially prepared one the base may be celluloid, the intermediate layer may be gelatin, soap, wax or of some similar material which is softer than celluloid, and the opaque coating may be paint or dye. If the sound is recorded on a disc instead of a film strip the base may be either glass or celluloid or the base may be made of some material such as cellophane or gelatin which is stiff enough to maintain the record in disc form and yet soft enough to permit the stylus to cut into it. In this case the opaque coating may exist directly on the base without the interposition of the intermediate layer.

In the system of making talking moving pictures now in use where the sound is recorded optically or photographically on a film strip it is impossible to play back any part of the sound track until the entire film strip is developed. Therefore, it is customary to have a supplementary recording system by which the sound can be recorded mechanically on a wax record. This can be played back at any time and is intended to serve as a check on the optical recordng system to show whether it is operating satisfactorily. However, one system may be working properly and the other not, so that the check is not an absolute one. In my system of recording sound no supplementary recording means is necessary. The operation of the recording system can be checked at any time because any part of the record can be played back immediately after it is made by passing it through an optical reproducing system which may be available for the purpose. If it is found that the system is not operating satisfactorily the difficulty may be corrected before the entire film is ruined as would be the case in an optical recording system.

As my recording system is purely mechanical all optical apparatus is dispensed with and, therefore, it is very simple. No change need be made in present optical reproducing systems in order to reproduce the sound from my record. I have therefore simulated or duplicated the present kind of sound track used in optical reproducing systems but have accomplished the initial recording by purely mechanical rather than optical or photographic means. The elimination of the slit used in the usual optical recording systems and the elimination of the usual lens system causes my sound track to have a better definition because the usual slit by reason of its finite width causes blurring of the sound track and the halation effects in the lens system cause blurring. The cutting edge on the stylus which I use may be so sharp that the variations in the sound track are clear and definite.

So far as I am aware no one has heretofore produced mechanically and in a commercially practical way a sound track capable of optical satisfactory reproduction. It has been proposed to record sound on a transparent base by causing a stylus to remove an opaque coating therefrom, this record being used as a negative in a photo-engraving process to ultimately produce a matrix from which records can be made for mechanical reproduction. However, in such a system the stylus is vibrated laterally and the transparent sound track formed by the vibration of the stylus, although of undulating character, is not of varying width and if it were used in an optical reproducing system the amount of light passing through the sound track would remain constant and no sound would be produced.

One of the things which enables me to cut an opaque coating from a film strip and produce a satisfactory sound track for optical reproduction is that the electro-magnetic unit which actuates the stylus is tuned so as to be resonant at the higher frequencies. This means that the armature carrying the stylus is quite stiff. Therefore, the stylus is capable of exerting the necessary effort on the film strip. Most mechanical recording systems operate on what is known as the constant velocity principle, i.e., the average speed of the recording stylus is substantially constant for all frequencies but the amplitude of vibration is greater for the lower frequencies than for the higher frequencies. In such a system looseness and freedom of movement is essential in order that the stylus may vibrate through large amplitudes at low frequencies and such looseness makes the stylus incapable of cutting through any material that offers much resistance. My system operates on the constant amplitude principle rather than the constant velocity principle, i.e., the amplitude of vibration of the stylus is substantially the same for high frequencies as for low frequencies due in part to its resonant response at the higher frequencies. In spite of the stiffness present in the electromagnetic unit the amplitude of vibration of the stylus is sufficient at all frequencies to produce a satisfactory sound track for optical reproduction because slight vibrations of the stylus in a direction normal to the surface of the film produce large changes in the width of the sound track.

The sound record, just as it comes from the recording machine may be used in an optical sound reproduction system, or photographic counterparts made from it may be so used. The optical sound reproduction system may be in conjunction with moving pictures, radio broadcasting and similar things.

I claim:

1. The method of making a sound record capable of optical reproduction which comprises removing an opaque coating from a transparent base so as to form a transparent sound track whose width varies in accordance with the sound to be recorded.

2. The method of making a sound record which comprises cutting through an opaque coating on a transparent base to form a transparent track which is of uniform width when no sound is being recorded and varying the width of said transparent track by the action of the sound waves to be recorded.

3. The method of making a sound record on a transparent base having an opaque coating and an intermediate transparent material between the base and the coating which is of softer composition than the base, which comprises moving the transparent base and simultaneously cutting through the opaque coating into said intermediate material and varying the depth of the cut in accordance with the sound to be recorded, the variations in the depth of the cut being accompanied by corresponding variations in the width of the transparent track formed in the coating by the cut whereby a transparent sound track is formed in the coating having a width which varies in accordance with the recorded sound.

4. A sound record comprising a transparent base having an opaque coating, an intermediate layer of transparent material between the base and the coating which is softer than the base, and a transparent sound track on the record formed by an uncoated portion of said intermediate layer, the width of said transparent sound track varying in accordance with the recorded sound.

5. A sound record comprising a flexible strip of transparent material constituting a base, an opaque coating on said strip, and a transparent sound track on the strip formed by an uncoated portion of the strip, the width of said transparent track varying in accordance with the recorded sound.

6. Apparatus for recording sound comprising means for moving the material on which the sound is to be recorded past the recording point, a cutting stylus at the recording point, and means for producing relative vibration between said stylus and said material in a direction normal to the surface of the material and in accordance with the sound to be recorded, said cutting stylus having an edge which is inclined with respect to the surface of the material to produce a sound track whose width varies in accordance with the recorded sound.

7. Apparatus for recording sound comprising means for moving the material on which the sound is to be recorded past the recording point, a cutting stylus at the recording point, and means for vibrating said stylus in a direction normal to the surface of said material and in accordance with the sound to be recorded, said cutting stylus having a cutting edge which forms an angle with the plane of the material on which the sound is recorded whereby movement of the stylus in a direction toward and away from said material will produce a sound track the width of which varies in accordance with the recorded sound.

8. Apparatus for mechanically making a sound record capable of optical reproduction comprising means for moving past the recording point a transparent material having a light-obstructive coating, a cutting stylus at the recording point, electro-magnetic means for vibrating said stylus in accordance with the sound to be recorded in a direction normal to the surface of said material, said stylus being adapted to remove an amount of coating from said material which varies with the sound being recorded, said electro-magnetic means having a degree of stiffness sufficient to make it resonant to the higher frequencies and to enable the stylus to cut through said coating.

9. Apparatus for mechanically making a sound record capable of optical reproduction comprising means for moving past the recording point a transparent material having an opaque coating, a cutting stylus at the recording point, electro-magnetic means for vibrating said stylus in accordance with the sound to be recorded in a direction normal to the surface of said material, said stylus having a wedge-shaped cutting edge with the apex of the wedge toward said material such that the stylus cuts a transparent track in said opaque coating and such that slight movements of the stylus by the electro-magnetic means will produce large variations in the width of said track.

10. Apparatus in accordance with claim 8 in which said electro-magnetic means has an armature on which the stylus is mounted, said armature having a degree of stiffness sufficient to make it resonant to the higher frequencies and to enable the stylus to cut through said opaque coating.

11. Apparatus for mechanically making a sound record capable of optical reproduction comprising means for moving past the recording point a transparent material having an opaque coating, a cutting stylus at the recording point, means for producing relative vibration between said stylus and said material in accordance with the sound to be recorded and in a direction normal to the surface of said material, said cutting stylus being so related to said material that in the absence of such relative vibration the stylus cuts a narrow strip of opaque coating from said transparent material so as to form a transparent track of uniform width, and said cutting stylus having a cutting edge such that slight relative vibration between the material and the stylus in a direction normal to the surface of said material will produce large variations in the width of said transparent sound track.

JAMES A. MILLER.